United States Patent
Shim et al.

(10) Patent No.: US 12,482,828 B2
(45) Date of Patent: Nov. 25, 2025

(54) METHOD FOR PREPARING A CATHODE OF A SECONDARY BATTERY AND A PURIFIED N-METHYL PYRROLIDONE, AND PURIFYING A WASTE N-METHYL PYRROLIDONE USING AN INHIBITOR

(71) Applicant: JAEWON INDUSTRIAL CO., LTD, Jeollanam-do (KR)

(72) Inventors: Jae Won Shim, Jeollanam-do (KR); Sung Won Shim, Jeollanam-do (KR); Byung Ki Son, Daejeon (KR); Hwan Choi, Jeollanam-do (KR); Youn Soo Shin, Jeollanam-do (KR); Tae Gi Choi, Jeollanam-do (KR); Hwa Yeong Choi, Jeollanam-do (KR); Yeong Su Choo, Jeollanam-do (KR)

(73) Assignee: JAEWON INDUSTRIAL CO., LTD, Jeollanam-Do (KR)

( * ) Notice: Subject to any disclaimer, the term of this patent is extended or adjusted under 35 U.S.C. 154(b) by 51 days.

(21) Appl. No.: 18/665,876

(22) Filed: May 16, 2024

(65) Prior Publication Data

US 2024/0387829 A1 Nov. 21, 2024

(30) Foreign Application Priority Data

May 16, 2023 (KR) .................. 10-2023-0063170
May 15, 2024 (KR) .................. 10-2024-0063534

(51) Int. Cl.
| | |
|---|---|
| *H01M 4/62* | (2006.01) |
| *B01D 3/34* | (2006.01) |
| *C07D 207/267* | (2006.01) |
| *H01M 4/04* | (2006.01) |
| *H01M 4/139* | (2010.01) |
| *H01M 4/02* | (2006.01) |

(52) U.S. Cl.
CPC .............. *H01M 4/628* (2013.01); *B01D 3/34* (2013.01); *C07D 207/267* (2013.01); *H01M 4/0404* (2013.01); *H01M 4/139* (2013.01); *H01M 2004/028* (2013.01)

(58) Field of Classification Search
None
See application file for complete search history.

(56) References Cited

U.S. PATENT DOCUMENTS 4,501,902 A 2/1985 Cleary

FOREIGN PATENT DOCUMENTS

| | | | |
|---|---|---|---|
| CN | 101543683 | A | 9/2009 |
| JP | 2004-284958 | A | 10/2004 |
| JP | 2007-99690 | A | 4/2007 |
| KR | 10-2007-0090501 | A | 9/2007 |
| KR | 10-2109401 | B1 | 5/2020 |
| WO | WO 2014/079720 | A1 | 5/2014 |

OTHER PUBLICATIONS

Hua et al. "Improvement of the Fe-NTA Sulfur Recovery System by the Addition of a Hydroxyl Radical Scavenger" (Jan. 2007).*
European Search Report For EP24176209.5 issued on Feb. 25, 2025 from European patent office in a counterpart European patent application.
Office action issued on Sep. 25, 2025 from Korean Patent Office in a counterpart Korean Patent Application No. 10-2024-0063534 (English translation is also submitted herewith.).

* cited by examiner

*Primary Examiner* — Austin Murata
(74) *Attorney, Agent, or Firm* — The PL Law Group, PLLC

(57) ABSTRACT

In a method for preparing a cathode of a secondary battery, a method for preparing a purified N-methyl pyrrolidinone (NMP), and a method for purifying a waste NMP, an inhibitor is added to prevent NMP from being decomposed to produce formaldehyde during the process. 1. The inhibitor may be a phenol-based antioxidant and/or an amine-based light stabilizer.

16 Claims, No Drawings

METHOD FOR PREPARING A CATHODE OF A SECONDARY BATTERY AND A PURIFIED N-METHYL PYRROLIDONE, AND PURIFYING A WASTE N-METHYL PYRROLIDONE USING AN INHIBITOR

CROSS-REFERENCE TO RELATED APPLICATION AND CLAIM OF PRIORITY

This application claims the benefit under 35 USC § 119 of Korean Patent Application Nos. 10-2023-0063170 filed on May 16, 2023 and 10-2024-0063534 filed on May 15, 2024 in the Korean Intellectual Property Office, the disclosures of which are incorporated by reference herein in their entirety.

BACKGROUND

1. Technical Field

The present invention relates to a method for preparing a cathode of a secondary battery and a purified N-methyl pyrrolidinone (NMP), and purifying a waste NMP, and more specifically, to a method for preparing a cathode of a secondary battery and a purified N-methyl pyrrolidinone (NMP), and a method for purifying a waste NMP, which can prevents NMP from being decomposed to produce formaldehyde by adding an inhibitor during a cathode manufacturing process or/and a distillation purification process.

2. Background Art

N-methyl pyrrolidinone (hereinafter also referred to as NMP) not only has both hydrophilic and hydrophobic groups in its chemical structure and thus has excellent performance in dissolving or diluting other substances, and also has a cyclized amide structure so that NMP is a colorless and transparent organic solvent that is stable even at high temperatures.

NMP is a product whose demand is rising in fields such as polymer polymerization, paint production, metal surface cleaner, pharmaceutical synthesis and purification, semiconductor and electronic material production, and lithium secondary battery production and NMP is used as a solvent or thinner in semiconductor, display, or secondary battery processes.

However, NMP can be decomposed into harmful formaldehyde by heat. In countries that do not allow the emission of even trace amounts of formaldehyde, it is necessary to prevent the production of formaldehyde when manufacturing a cathode of secondary batteries using NMP.

In addition, a high-purity NMP is required for semiconductor, display, or secondary battery processes. In particular, due to the carbon neutrality policy, there is an increasing need to recover and reuse NMP used in semiconductor, display, secondary battery processes, or the like. However, in order to manufacture a high purity NMP, a distillation purification process must be performed at high temperature. There is a problem that a small amount of NMP is decomposed into formaldehyde during this process.

Therefore, there is a need to minimize or prevent the generation of formaldehyde during the secondary battery manufacturing process or the manufacturing process of purified NMP.

SUMMARY

The object of the present invention is to provide a method for preparing a cathode of a secondary battery and a purified N-methyl pyrrolidinone (NMP), and purifying a waste NMP, which can prevent NMP from being decomposed to produce formaldehyde by adding an inhibitor during the cathode manufacturing and NMP distillation purification process.

It is one aspect of the present invention to provide a method for preparing a cathode of a secondary battery, the method including: coating a dispersion including a N-methyl pyrrolidinone (NMP), an inhibitor and a cathode active material on a current collector.

It is another aspect of the present invention to provide a method for preparing a purified N-methyl pyrrolidinone (NMP), the method including: adding an inhibitor to a waste NMP; and purifying the waste NMP by distillation to obtain a purified NMP, and a purified NMP by the preparing method.

It is another aspect of the present invention to provide a method for purifying a waste N-methyl pyrrolidinone (NMP), the method including: adding an inhibitor to a waste NMP; and purifying the waste NMP, to which the inhibitor is added, by distillation.

The inhibitor prevents NMP from being decomposed to produce formaldehyde during the secondary battery manufacturing process or distillation purification process performed at high temperatures.

The inhibitor may be an antioxidant, for example, a phenol-based antioxidant or an amine-based light stabilizer.

Preferably, in the method for manufacturing the cathode of a secondary battery, amounts of an inhibitor contained in the dispersion may be greater than 50 ppm (in excess of 50 ppm), preferably, 100 to 10,000 ppm, more preferably, 100 to 1,000 ppm based on the weight of NMP. That is, more than 50 to 10,000 mg, preferably 100 to 10,000 mg of inhibitor may be used per 1 kg of NMP.

In the method of preparing a cathode of a secondary battery, NMP contained in the dispersion may be NMP prepared by the method for preparing a purified NMP.

In the method for preparing a purified NMP and the method for purifying a waste NMP, the waste NMP may be recovered after use in a semiconductor manufacturing process, display manufacturing process, or secondary battery manufacturing process.

According to the present invention, an inhibitor can be added in the process manufacturing a cathode of a secondary battery and process purifying NMP, thereby preventing the decomposition of NMP into formaldehyde, which can prevent the discharge of substances harmful to the human body in advance.

According to an embodiment of the present application, a method for preparing a cathode of a secondary battery includes coating a dispersion including a N-methyl pyrrolidinone (NMP), a first inhibitor and a cathode active material on a current collector, wherein the first inhibitor prevents the NMP from being decomposed to produce formaldehyde during the coating process, and more than 50 ppm of the first inhibitor based on the weight of the NMP is contained in the dispersion.

According to an embodiment of the present application, a method for preparing a purified N-methyl pyrrolidinone (NMP) includes adding a first inhibitor to a waste NMP, and purifying the waste NMP by distillation to obtain a purified NMP, wherein the first inhibitor prevents the waste NMP from being decomposed to produce formaldehyde during the distillation process, and the first inhibitor is added in excess of 50 ppm based on the weight of the waste NMP.

According to an embodiment of the present application, a method for purifying a waste N-methyl pyrrolidinone (NMP) includes adding an inhibitor to a waste NMP, and purifying the waste NMP, to which the inhibitor is added, by distillation, wherein the inhibitor prevents the waste NMP from being decomposed to produce formaldehyde during the distillation process, and the inhibitor is added in excess of 50 ppm based on the weight of the waste NMP.

In addition, according to the present invention, a high-purity NMP required in display, semiconductor, and secondary battery production processes, or the like can be manufactured, thereby reducing defect rates in the processes.

DETAILED DESCRIPTION OF THE EMBODIMENTS

Unless otherwise defined, all terms used herein have the same meaning as commonly understood by one of ordinary skill in the art to which this invention belongs. When terms used herein discord from the commonly understood meaning, the terms will be interpreted as defined herein.

Throughout the specification, when a part 'include(s)' a certain component, it means further including other components, rather than excluding other components, unless otherwise stated.

Terms, such as a first, a second, A, B, (a), (b) or the like may be used herein when describing components of the present invention. Each of these terminologies is not used for defining an essence, order or sequence of a corresponding component but used merely to distinguish the corresponding component from other component(s).

In this specification, N-methyl pyrrolidinone is also referred to as 'NMP'.

Hereinafter, the present invention will be described in more detail.

It is one aspect of the present invention to provide a method for preparing a cathode (positive electrode) of a secondary battery, the method including: coating a dispersion (a cathode active material) including a N-methyl pyrrolidinone (NMP), a first inhibitor and a cathode active material on a current collector.

That is, a cathode electrode of a secondary battery is manufactured by mixing a cathode active material, a conductive material, and a binder to prepare a slurry, and then coating this slurry (herein referred to as a dispersion or a cathode material) on a current collector such as aluminum foil.

In the wet process, PVDF, which is a polymer compound that stably holds the structure of the electrode, is usually used as a binder, and NMP is used as a solvent.

The reason why NMP is used as a solvent in the secondary battery process is because it has excellent solubility in binders and stably transports lithium ions when manufacturing slurry of a cathode material.

In addition, when water is used as a solvent during slurry production, there may be problem that the capacity decreases when lithium ions are released while the cathode active material reacts with water. When NMP is used as a solvent instead of water, there is an advantage that the lithium ions contained in the cathode active material can be stably sent to an anode (a negative electrode).

However, despite the advantages of NMP as a solvent, NMP has the disadvantage of being highly toxic, causing environmental problems, and being more expensive than water. Therefore, it is necessary to recover and reuse the NMP used in the secondary battery process while coating a cathode material on the current collector.

A process of coating a cathode material and recovering a waste NMP is carried out at high temperatures. Therefore, as shown in Reaction Scheme 1 below, NMP may be oxidized to produce formaldehyde, a harmful substance, and pyrrolidin-2-one, an impurity.

[Reaction Scheme 1]

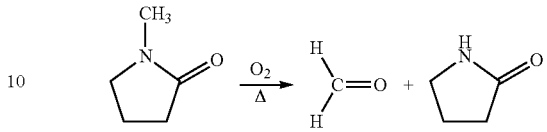

Therefore, it is needed to minimize or completely prevent the production of formaldehyde during the process for manufacturing a cathode of secondary battery and recovering a waste NMP.

The present invention proposes using an inhibitor to prevent NMP from being decomposed by heat and oxygen and produce harmful substances such as formaldehyde during the process for manufacturing a cathode of secondary battery using NMP as a solvent. That is, in order to suppress the reaction according to Reaction Scheme 1, an inhibitor is added to the cathode material (or dispersion) including a cathode active material, NMP, and dispersant, etc., and then a process for coating a cathode material and recovering a used NMP is performed.

In this way, when a cathode of a secondary battery is manufactured by adding an inhibitor, it is possible to inhibit the reaction from proceeding. As a result, the production of formaldehyde can be minimized or prevented, thereby improving the working environment and allowing secondary battery to be manufactured even in countries with strict standards for formaldehyde emission.

Here, the inhibitor added may be a material capable of preventing oxidation in Reaction Scheme 1, that is, an antioxidant, and preferably may be at least one of a phenol-based antioxidant or an amine-based light stabilizer.

The phenol-based antioxidant may be selected from the group consisting of 2,6-di-tert-butyl-4-methylphenol (BHT), 4-tert-butyl catechol (TBC), HQ (Hydroquinone), methylhydroquinone, benzoquinone, p-methoxyphenol (MEHQ), 4-tert-butylphenol (TBP), picric acid, t-butylhydroquinone, o-cresol, m-cresol, p-cresol, tetrakis[methylene-3-(3,5-di-tert-butyl-4-hydroxyphenyl) propionate]methane, octadecyl-3-(3,5-di-tert-butyl-4-hydroxyphenyl)propionate, benzenepropanoic acid, 3,5-bis(1,1-dimethylethyl)-4-hydroxy-, C7-9-branched alkyl esters, triethylene glycol-bis-3-(3-tert-butyl-4-hydroxy-5-methylphenyl)propionate, tris-(3,5-di-tert-butylhydroxybenzyl)isocyanurate, thiodiethylene bis[3-(3,5-di-tert-butyl-4-hydroxyphenyl) propionate], N,N'-hexamethylenebis(3,5-di-tert-butyl-4-hydroxyhydrocinnamamide), and 1,3,5-trimethyl-2,4,6-tris(3,5-di-tert-butyl-4-hydroxybenzyl)benzene.

The amine-based light stabilizers may be selected from the group consisting of 1,6-hexanediamine, CAS No. 192268-64-7 (N,N'-bis(2,2,6,6-tetramethyl-4-piperidinyl)-, polymer with 2,4,6-trichloro-1,3,5-triazine, reaction products with N-butyl-1-butanamine and N-butyl-2,2,6,6-tetramethyl-4-piperidinamine), CAS No. 65447-77-0 (butanedioic acid, 1,4-dimethyl ester, polymer with 4-hydroxy-2,2,6,6-tetramethyl-1-piperidineethanol), bis(1,2,2,6,6-pentamethyl-4-piperidinyl)sebacate, methyl(1,2,2,6,6-pentamethyl-4-piperidinyl)sebacate), and bis(2,2,6,6-tetramethyl-4-piperidinyl)sebacate.

Preferably, the inhibitor may be selected from the group consisting of p-methoxyphenol (MEHQ), 2,6-di-tert-butyl-4-methylphenol (BHT), and p-cresol.

In addition, the amount of the inhibitor is sufficient to inhibit the oxidation reaction. Therefore, an inhibitor is used in amounts greater than 50 ppm (in excess of 50 ppm), preferably, in amounts of 100 to 10,000 ppm, more preferably, in amounts of 100 to 1,000 ppm based on the weight of NMP. That is, more than 50 to 10,000 mg, preferably 100 to 10,000 mg of inhibitor can be used per 1 kg of NMP.

NMP, a solvent used in manufacturing a cathode, may be NMP purified according to the present invention. Hereinafter, the method for preparing a purified NMP according to the present invention will be described.

In one embodiment, the present invention provides a method for preparing a purified N-methyl pyrrolidinone, the method including: adding a first inhibitor to a waste NMP; and purifying the waste NMP by distillation to obtain a purified NMP, and a purified NMP by the preparing method.

In another embodiment, the present invention provides a method for purifying a waste NMP, the method including: adding an inhibitor to a waste NMP; and purifying the waste NMP, to which the inhibitor is added, by distillation.

NMP to be purified may be an industrial raw material, or it may be a waste NMP recovered after use in a semiconductor process, secondary battery manufacturing process, display manufacturing process, etc. For example, it may be a waste NMP recovered after use in the secondary battery manufacturing process described above.

Since the recovered waste NMP contains a large amount of impurities, it must be purified through the purification process by distillation before being reused.

However, since the distillation purification process is performed at high temperature, NMP may be decomposed into formaldehyde, pyrrolidin-2-one, etc., as shown in Reaction Scheme 1 above. When formaldehyde is produced, it makes the working environment worse and causes serious environmental problems, so it is necessary to prevent the production of formaldehyde.

Therefore, in the present invention, an inhibitor is added to NMP to be purified, and then a distillation purification process is performed. When an inhibitor is added in this way, even a trace amount of NMP can be prevented from being oxidized even if distillation purification is performed at high temperature, so the generation of formaldehyde can be minimized or completely prevented.

Even if an inhibitor is added in the process of manufacturing a cathode of a secondary battery, the recovered NMP does not contain an effective amount of inhibitors. This is because highly volatile NMP is easily recovered during the process of recovering a waste NMP, but the material used as an inhibitor is heavy and therefore it is difficult to recover along with NMP.

An inhibitor is used to suppress oxidation reactions at high temperatures. Therefore, an antioxidant, preferably, a phenol-based antioxidant and/or an amine-based light stabilizer, may be used as an inhibitor. A phenol-based antioxidant and/or an amine-based light stabilizer is/are the same as mentioned above.

Preferably, an inhibitor may be selected from the group consisting of p-methoxyphenol (MEHQ), 2,6-di-tert-butyl-4-methylphenol (BHT), and p-cresol.

The inhibitor may be used in excess of 50 ppm, in amounts of more than 50 to 10,000 ppm, preferably, 100 to 10,000 ppm, based on the weight of NMP to be purified. That is, more than 50 to 10,000 mg, preferably, 100 to 10,000 mg of an inhibitor with respect to 1 kg of NMP may be used.

If the amount of the inhibitor added based on NMP is 50 ppm or less, it is difficult to completely prevent the decomposition reaction from occurring, and the amount of the inhibitor is sufficient as long as it can prevent the oxidative composition reaction, and so there is no need to add more than necessary. Therefore, the inhibitor is preferably added in an amount of greater than 50 ppm and less than 10,000 ppm.

For distillation and purification, a tray column or a packed column may be used, and the temperature of the reboiler is 130 to 180° C., more preferably, 130 to 140° C.

Through the distillation purification process, impurities, especially impurities and inhibitors generated during the semiconductor, display, or secondary battery production processes can be removed to thereby increase the purity of NMP.

Further, in order to remove metals or particles contained in distillation-purified NMP, the method may include a step of passing the distillation-purified NMP through an ion filter and/or particle filter. Metals can be removed by passing them through an ion filter (Protego plus purifier (CHEM-LINE II) available from Entegris). NMP from which the metal has been removed is continuously passed through a particle filter (PEMFLOW (ABD2UFD3EH1 available from PALL, a product with a pore size of 0.05 um) to remove particles. Thereby, high-purity NMP can finally be obtained.

In addition, preferably, an inhibitor may be further added to the purified NMP to prevent distillation-purified NMP from decomposing before it is used in a secondary battery manufacturing process or during a secondary battery manufacturing process That is, after adding a first inhibitor to a waste NMP and then distilling the waste NMP, a secondary inhibitor may be further added to the purified NMP. In this way, when the purified NMP, to which a second inhibitor is added, is used as a solvent in a secondary battery manufacturing process, there may be no need to add other inhibitor to the dispersion (cathode material) in a cathode manufacturing process.

Hereinafter, the present invention will be described in more detail with reference to examples. Since these examples are merely for illustrating the present invention, the scope of the present invention is not to be construed as being limited by these examples.

Test Example 1

Dispersion (a cathode material) containing a cathode active material (73 wt %), a carbon nanotube (1 wt %), a polymer dispersant (3 wt %), NMP (23 wt %) and p-methoxy phenol was exposed to heat and oxygen at 140° C. or more for 10 minutes, and was coated on aluminum foil (a current collector) to manufacture a cathode. Here, 0.1 part by weight of p-methoxy phenol was used based on 100 parts by weight of NMP. That is, 1,000 ppm of p-methoxy phenol based on the weight of NMP was used. Afterwards, NMP used as a solvent was recovered and its components were analyzed. The result of component analysis of the recovered NMP is shown in Table 1 below.

p-Methoxy phenol was added to the recovered NMP. Here, 0.1 parts by weight of p-methoxy phenol per 100 parts by weight of the recovered NMP was added. That is, 1,000 ppm of p-methoxy phenol based on the recovered NMP was added. Afterwards, the recovered NMP, to which p-Methoxy phenol was added, was put into the reboiler of the distillation tower.

Subsequently, the temperature of the reboiler of the distillation tower was maintained at 140° C., the mixture was stirred for 10 minutes, and then the distillation process is performed while maintaining the tower bottom temperature of the 50-stage tray column at 130~140° C. and the vacuum level at −700 mmHg. The result of analyzing the components of a purified NMP obtained after performing the distillation process is shown in Table 2 below.

Test Example 2

It is the same as Example 1 except that BHT (2,6-di-tert-butyl-4-methylphenol) was used instead of p-methoxy phenol in the cathode manufacturing and distillation process.

Test Example 3

It is the same as Example 1 except that 500 ppm of p-cresol was used in the cathode manufacturing and distillation process.

Test Example 4

It is the same as Example 1 except that 500 ppm of BHT was used in the cathode manufacturing and distillation process.

Test Example 5

It is the same as Example 1 except that 500 ppm of MEHQ was used in the cathode manufacturing and distillation process.

Test Example 6

It is the same as Example 1 except that 100 ppm of p-cresol was used in the cathode manufacturing and distillation process.

Test Example 7

It is the same as Example 1 except that 100 ppm of BHT was used in the cathode manufacturing and distillation process.

Test Example 8

It is the same as Example 1 except that 100 ppm of MEHQ was used in the cathode manufacturing and distillation process.

Comparative Example 1

It is the same as Example 1 except that 50 ppm of p-cresol was used in the cathode manufacturing and distillation process.

Comparative Example 2

It is the same as Example 1 except that 50 ppm of BHT was used in the cathode manufacturing and distillation process.

Comparative Example 3

It is the same as Example 1 except that 50 ppm of MEHQ was used in the cathode manufacturing and distillation process.

Comparative Example 4

It is the same as Example 1 except that no inhibitor was added in the cathode manufacturing and distillation process.

The results of analyzing the components of the recovered NMP after manufacturing the cathode by GC (gas chromatography) and HPLC (high performance liquid chromatography) are shown in Table 1 below, and the results of analyzing the components of the purified NMP obtained after distillation purification by GC and HPLC are shown in Table 2 below. The mass of formaldehyde was measured by HPLC, and the masses of the remaining components were measured by GC. In Tables 1 and 2, the units of each components is ppm.

TABLE 1

|  | pyrrolidin-2-one | FA | NMS | RR | FR | MeOH | NMPA | HPO | GBL | NM3P | N-1 | N-2 | purity(%) |
| --- | --- | --- | --- | --- | --- | --- | --- | --- | --- | --- | --- | --- | --- |
| Sample of NMP | ND | ND | ND | 77 | 8 | ND | ND | ND | 118 | 3 | 414 | 285 | 99.91 |
| Test Example 1 | ND | ND | 63 | 40 | 18 | ND | ND | ND | 113 | 2 | 418 | 284 | 99.90 |
| Test Example 2 | ND | ND | 71 | 77 | 9 | ND | ND | 6 | 109 | 6 | 411 | 272 | 99.90 |
| Test Example 3 | ND | ND | 63 | 13 | 9 | ND | ND | ND | 110 | 6 | 399 | 307 | 99.91 |
| Test Example 4 | ND | ND | 47 | 66 | 9 | ND | ND | 4 | 108 | 3 | 394 | 283 | 99.91 |
| Test Example 5 | ND | ND | 65 | 73 | 11 | ND | ND | 2 | 114 | 2 | 392 | 313 | 99.90 |
| Test Example 6 | ND | ND | 68 | 79 | 9 | ND | ND | ND | 109 | 6 | 384 | 267 | 99.90 |
| Test Example 7 | ND | ND | 61 | 10 | 10 | ND | ND | ND | 113 | 1 | 391 | 278 | 99.91 |
| Test Example 8 | ND | ND | 70 | 74 | 8 | ND | ND | ND | 112 | 4 | 361 | 273 | 99.91 |
| comparative Example 1 | 2 | 0.24 | 274 | 109 | 11 | ND | ND | 65 | 113 | 17 | 420 | 268 | 99.87 |
| comparative Example 2 | 7 | 0.38 | 241 | 112 | 11 | ND | ND | 79 | 107 | 18 | 413 | 272 | 99.87 |
| comparative Example 3 | 1 | 0.17 | 236 | 105 | 12 | ND | ND | 88 | 112 | 20 | 381 | 271 | 99.88 |
| comparative Example 4 | 10 | 0.67 | 173 | 94 | 34 | ND | ND | 67 | 108 | 22 | 417 | 279 | 99.88 |

TABLE 2

|  | pyrrolidin-2-one | FA | NMS | RR | FR | MeOH | NMPA | HPO | GBL | NM3P | N-1 | N-2 | purity(%) |
| --- | --- | --- | --- | --- | --- | --- | --- | --- | --- | --- | --- | --- | --- |
| Test Example 1 | ND | ND | ND | 0 | 8 | ND | ND | ND | 117 | 4 | 414 | 285 | 99.92 |
| Test Example 2 | ND | ND | 3 | 0 | 5 | ND | ND | ND | 110 | 4 | 409 | 277 | 99.92 |

TABLE 2-continued

| | pyrrolidin-2-one | FA | NMS | RR | FR | MeOH | NMPA | HPO | GBL | NM3P | N-1 | N-2 | purity(%) |
|---|---|---|---|---|---|---|---|---|---|---|---|---|---|
| Test Example 3 | ND | ND | 1 | 0 | 3 | ND | ND | ND | 108 | 2 | 412 | 309 | 99.92 |
| Test Example 4 | ND | ND | ND | 0 | 4 | ND | ND | 2 | 111 | 3 | 399 | 281 | 99.92 |
| Test Example 5 | ND | ND | ND | 1 | 2 | ND | ND | 1 | 114 | 2 | 398 | 310 | 99.92 |
| Test Example 6 | ND | ND | 2 | 0 | 6 | ND | ND | ND | 114 | 5 | 398 | 269 | 99.92 |
| Test Example 7 | ND | ND | 2 | 0 | 3 | ND | ND | ND | 116 | 4 | 388 | 288 | 99.92 |
| Test Example 8 | ND | ND | 4 | 14 | 4 | ND | ND | ND | 112 | 3 | 370 | 279 | 99.92 |
| comparative Example 1 | 3 | 0.44 | 77 | 36 | 23 | ND | ND | 75 | 113 | 18 | 421 | 278 | 99.90 |
| comparative Example 2 | 6 | 0.78 | 90 | 72 | 18 | ND | ND | 75 | 112 | 21 | 410 | 276 | 99.89 |
| comparative Example 3 | 8 | 0.87 | 98 | 67 | 17 | ND | ND | 98 | 109 | 22 | 396 | 278 | 99.89 |
| comparative Example 4 | 11 | 1.07 | 90 | 34 | 34 | ND | ND | 97 | 116 | 24 | 410 | 282 | 99.89 |

(ND: not detected. FA: formaldehyde. NMS: 1-methylsuccinimide. RR: unknown heavy materials. FR: unknown light materials, McOH: methanol. NMPA: N-methyl-propionamide, HPO: NMP Hydroperoxide, GBL: gamma-butyrolactone, NM3P: 1-methyl-3-pyrrolin-2-one, N-1:1,3-dimethyl-2-pyrrolidone, N-2:1,4-dimethyl-2-pyrrolidone)

In Table 1, the sample of NMP is a solvent NMP used in process for manufacturing a cathode of a secondary battery, and the purity indicates the purity of NMP.

First, looking at Table 1, it can be seen that impurities such as formaldehyde, pyrrolidin-2-one, and NMS, etc. are not contained in the sample of NMP used in process for manufacturing a cathode of a secondary battery.

In addition, it can be seen that formaldehyde (FA) and pyrrolidin-2-one are not detected when an inhibitor is used in amounts of 100 to 1,000 ppm based on the weight of NMP (Test Examples 1 to 8), but a small amount of formaldehyde and pyrrolidin-2-one are contained in the recovered NMP when 50 ppm of an inhibitor is used (Comparative Examples 1 to 8) or no inhibitor is added (Comparative Example 4).

Therefore, it can be seen that the amount of formaldehyde, pyrrolidin-2-one, and other impurities contained in the recovered NMP varies depending on the amount of inhibitor added when a cathode is manufactured. In the process of manufacturing a cathode of a secondary battery, the inhibitor needs to be added in excess of 50 ppm, preferably, greater than 50 to 10,000 ppm, more preferably, 100 to 10,000 ppm, more preferably, 100 to 1,000 ppm based on the weight of NMP.

Meanwhile, impurities may be produced during the process of manufacturing a cathode. In Table 1, it can be seen that the recovered NMP contained a larger amount of impurities than the sample of NMP.

Therefore, in order to reuse a recovered NMP, it is necessary to purify the NMP. The present invention proposes a method for purifying a recovered NMP by distillation.

Table 2 shows an analysis of the components of a purified NMP that is purified by distillation after adding an inhibitor to a waste NMP recovered, wherein the recovered NMP is recovered after manufacturing a cathode of a secondary battery. Referring to Tables 1 and 2, it can be seen that the purity of NMP is improved by distillation purification.

In addition, the distillation purification process is performed at high temperature, and it can be seen that it is impossible to prevent NMP from decomposing to produce formaldehyde when an inhibitor is not added (Comparative Example 4) or less than a certain amount is added (Comparative Examples 1 to 3).

Therefore, in order to prevent NMP from being decomposed to produce formaldehyde and pyrrolidin-2-one during the distillation purification process, it is necessary to add more than 50 ppm of inhibitor based on the weight of NMP.

Preferably, an inhibitor needs to be added in amounts of greater than 50 to 10,000 ppm, preferably, 100 to 10,000 ppm, more preferably, 100 to 1,000 ppm based on the weight of NMP.

The above description is merely an illustrative description of the present invention, and those skilled in the art to which the present invention pertains will be capable of various modifications without departing from the essential characteristics of the present invention. Therefore, the embodiment disclosed herein is intended to illustrate the present invention rather than to limit the present invention and the scope of the present invention is not limited by the embodiments. The scope of the present invention should be construed on the basis of the claims, and it shall be construed that all technologies within the scope equivalent to the claims are included in the scope of rights the present invention.

What is claimed is:

1. A method for preparing a cathode of a secondary battery, the method comprising:
   coating a dispersion comprising a N-methyl pyrrolidinone (NMP), a first inhibitor and a cathode active material on a current collector,
   wherein the first inhibitor prevents the NMP from being decomposed to produce formaldehyde during the coating process, and
   more than 50 ppm of the first inhibitor based on the weight of the NMP is contained in the dispersion.

2. The method of claim 1, wherein the first inhibitor is a phenol-based antioxidant and/or an amine-based light stabilizer.

3. The method of claim 2, wherein the phenol-based antioxidant is selected from the group consisting of 2,6-di-tert-butyl-4-methylphenol(BHT), 4-tert-butyl catechol (TBC), HQ(Hydroquinone), methylhydroquinone, benzoquinone, p-methoxyphenol(MEHQ), 4-tert-butylphenol (TBP), picric acid, t-butylhydroquinone, o-cresol, m-cresol, p-cresol, tetrakis[methylene-3-(3,5-di-tert-butyl-4-hydroxyphenyl)propionate]methane, octadecyl-3-(3,5-di-tert-butyl-4-hydroxyphenyl)propionate, benzenepropanoic acid, 3,5-bis(1,1-dimethylethyl)-4-hydroxy-, C7-9-branched alkyl esters, triethylene glycol-bis-3-(3-tert-butyl-4-hydroxy-5-methylphenyl)propionate, tris-(3,5-di-tert-butylhydroxybenzyl)isocyanurate, thiodiethylene bis[3-(3,5-di-tert-butyl-4-hydroxyphenyl)propionate], N,N'-hexamethylenebis(3,5-di-tert-butyl-4-hydroxyhydrocinnamamide), and 1,3,5-trimethyl-2,4,6-tris(3,5-di-tert-butyl-4-hydroxybenzyl) benzene, and the amine-based light stabilizers is selected from the group consisting of 1,6-hexanediamine, CAS No. 192268-64-7 (N,N'-bis(2,2,6,6-tetramethyl-4-piperidinyl)-, polymer with 2,4,6-trichloro-1,3,5-triazine, reaction products with N-butyl-1-butanamine and N-butyl- 2,2,6,6-tetramethyl-4-piperidinamine), CAS No. 65447-77-0 (butanedioic acid, 1,4-dimethyl ester, polymer with 4-hydroxy-2,2,6,6-tetramethyl-1-piperidineethanol), bis(1,2,2,6,6-pentamethyl-4-piperidinyl) sebacate, methyl (1,2,2,6,6-pentamethyl-4-piperidinyl) sebacate), and bis(2,2,6,6-tetramethyl-4-piperidinyl) sebacate.

4. The method of claim 3, wherein the first inhibitor is selected from the group consisting of p-methoxyphenol (MEHQ), 2,6-di-tert-butyl-4-methylphenol (BHT), p-cresol, and a combination thereof.

5. The method of claim 1, wherein 10 to 10,000 ppm of the first inhibitor based on the weight of the NMP is contained in the dispersion.

6. The method of claim 1, wherein the NMP is a purified NMP,
the purified NMP is prepared by the method comprising:
adding a second inhibitor to a waste NMP; and
purifying the waste NMP to which the second inhibitor is added,
wherein the first inhibitor and the second inhibitor are the same or different, and
the second inhibitor is added in excess of 50 ppm based on the weight of the waste NMP.

7. A method for preparing a purified N-methyl pyrrolidinone (NMP), the method comprising:
adding a first inhibitor to a waste NMP; and
purifying the waste NMP by distillation to obtain a purified NMP,
wherein the first inhibitor prevents the waste NMP from being decomposed to produce formaldehyde during the distillation process, and
the first inhibitor is added in excess of 50 ppm based on the weight of the waste NMP.

8. The method of claim 7, wherein the first inhibitor is a phenol-based antioxidant and/or an amine-based light stabilizer.

9. The method of claim 8, wherein the phenol-based antioxidant is selected from the group consisting of 2,6-di-tert-butyl-4-methylphenol (BHT), 4-tert-butyl catechol (TBC), HQ(Hydroquinone), methylhydroquinone, benzoquinone, p-methoxyphenol(MEHQ), 4-tert-butylphenol (TBP), picric acid, t-butylhydroquinone, o-cresol, m-cresol, p-cresol, tetrakis[methylene-3-(3,5-di-tert-butyl-4-hydroxyphenyl)propionate]methane, octadecyl-3-(3,5-di-tert-butyl-4-hydroxyphenyl)propionate, benzenepropanoic acid, 3,5-bis(1,1-dimethylethyl)-4-hydroxy-, C7-9-branched alkyl esters, triethylene glycol-bis-3-(3-tert-butyl-4-hydroxy-5-methylphenyl)propionate, tris-(3,5-di-tert-butylhydroxybenzyl) isocyanurate, thiodiethylene bis[3-(3,5-di-tert-butyl-4-hydroxyphenyl)propionate], N,N'-hexamethylenebis(3,5-di-tert-butyl-4-hydroxyhydrocinnamamide), and 1,3,5-trimethyl-2,4,6-tris(3,5-di-tert-butyl-4-hydroxybenzyl)benzene, and
the amine-based light stabilizers is selected from the group consisting of 1,6-hexanediamine, CAS No. 192268-64-7 (N,N'-bis(2,2,6,6-tetramethyl-4-piperidinyl)-, polymer with 2,4,6-trichloro-1,3,5-triazine, reaction products with N-butyl-1-butanamine and N-butyl-2,2,6,6-tetramethyl-4-piperidinamine), CAS No. 65447-77-0 (butanedioic acid, 1,4-dimethyl ester, polymer with 4-hydroxy-2,2,6,6-tetramethyl-1-piperidineethanol), bis(1,2,2,6,6-pentamethyl-4-piperidinyl) sebacate, methyl(1,2,2,6,6-pentamethyl-4-piperidinyl) sebacate), and bis(2,2,6,6-tetramethyl-4-piperidinyl) sebacate.

10. The method of claim 9, wherein the first inhibitor is selected from the group consisting of p-methoxyphenol (MEHQ), 2,6-di-tert-butyl-4-methylphenol (BHT), p-cresol, and a combination thereof.

11. The method of claim 7, wherein the first inhibitor is added in an amount of 100 to 10,000 ppm based on the weight of the waste NMP.

12. The method of claim 7, wherein the waste NMP is recovered after use in a semiconductor production process, a display production process, and/or a secondary battery production process.

13. The method of claim 12, wherein the waste NMP is recovered after coating a dispersion comprising the purified NMP, a second inhibitor and a cathode active material on a current collector in the process of manufacturing a cathode of a secondary battery, and the first inhibitor and the second inhibitor are the same or different from each other.

14. The method of claim 13, wherein the second inhibitor is added in excess of 50 ppm based on the weight of the purified NMP.

15. A purified N-methyl pyrrolidinone prepared by the method of claim 7.

16. A method for purifying a waste N-methyl pyrrolidinone (NMP), the method comprising:
adding an inhibitor to a waste NMP; and
purifying the waste NMP, to which the inhibitor is added, by distillation,
wherein the inhibitor prevents the waste NMP from being decomposed to produce formaldehyde during the distillation process, and
the inhibitor is added in excess of 50 ppm based on the weight of the waste NMP.

* * * * *